Jan. 9, 1934.  F. W. CUTLER  1,942,538
CONVEYER
Filed March 25, 1930
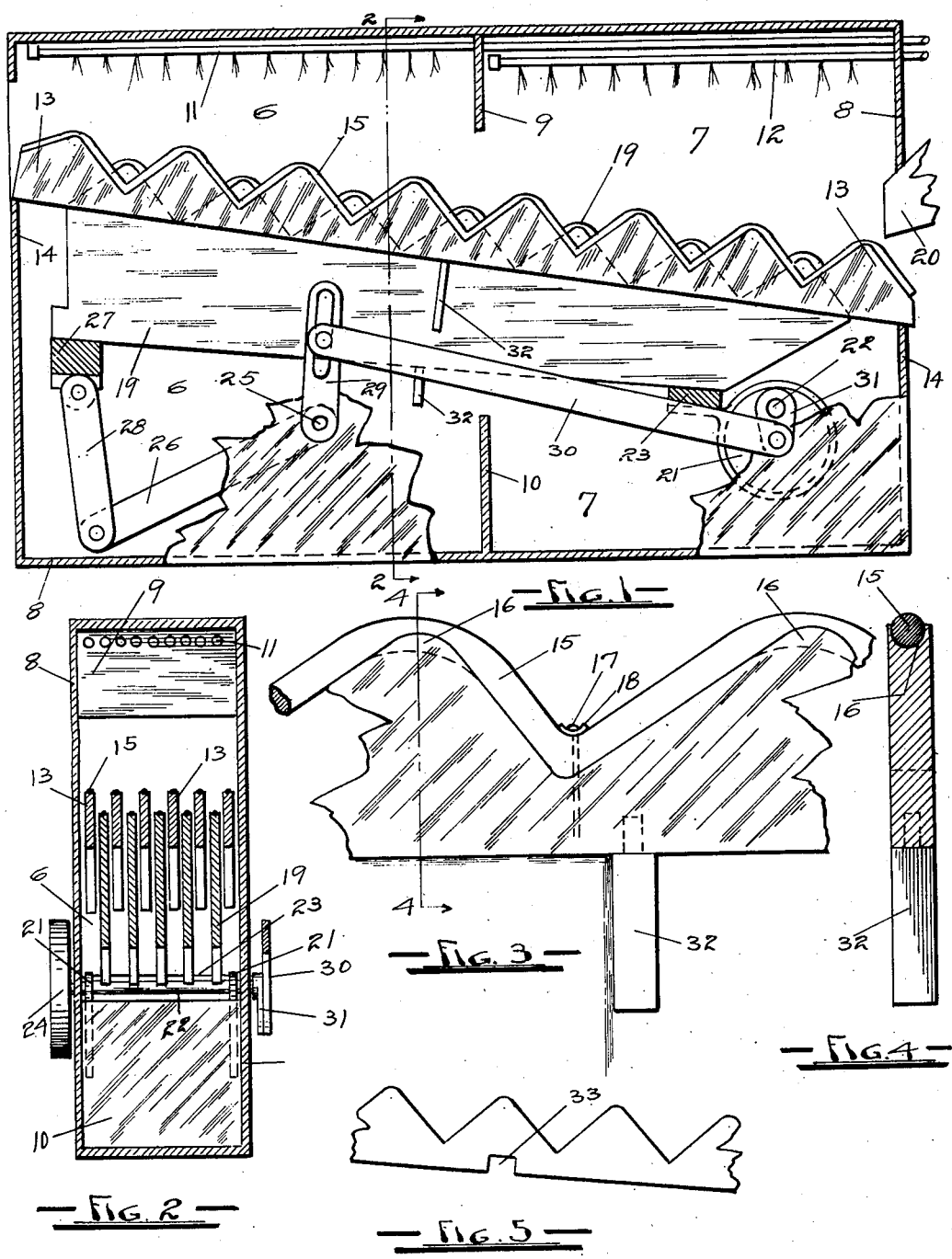
INVENTOR
FRANK W. CUTLER
BY C. F. Blake
ATTY.

Patented Jan. 9, 1934

1,942,538

UNITED STATES PATENT OFFICE 1,942,538

CONVEYER

Frank W. Cutler, Portland, Oreg., assignor to Food Machinery Corporation, San Jose, Calif., a corporation of Delaware Application March 25, 1930. Serial No. 438,819

4 Claims. (Cl. 146—194)

My invention relates to conveyers in general, and particularly to such conveyers as are used with fruit washing devices, the object being to provide against the intermingling of various washing liquids, and the mixing one with the other of such liquids by reason of any of such liquids flowing along the conveyer members into a receptacle containing another liquid. A further object is to provide in such a conveyer means for varying the movement thereof so that the movement at the receiving end shall be different from the movement at the discharging end thereof, for the purpose of providing a movement at the discharge end that will effectively eliminate any congestion of the fruit as it is moved from the conveyer to any convenient receiving device, such as a dryer. I accomplish these objects by means of the construction illustrated in the accompanying drawing, which is a part of this application for Letters Patent, like characters of reference indicating like parts throughout the several views thereof, and in which:

Fig. 1 is a side elevation of my device, parts being broken away and sectioned to best illustrate the construction.

Fig. 2 is a section upon line 2—2 of Fig. 1.

Fig. 3 is a fragmentary view of one of the conveyer members upon an enlarged scale.

Fig. 4 is a section upon line 4—4 of Fig 3.

Fig. 5 is a portion of one of the conveyer members illustrating a modified construction.

I illustrate my device installed in a washer, which washer is provided with a plurality of compartments or tanks, in the illustration there being two such compartments designated as 6 and 7. Said compartments are formed within a tank 8 by the provision of a wall 9 above the conveyer and a similar wall 10 below the conveyer, as shown in Fig. 1. Said compartments contain washing liquids, in the washing of fruits these liquids are usually a chemical treating liquid contained in compartment 7, and a rinsing liquid contained in compartment 6. Means for directing said liquids upon fruit that lies upon the conveyer is a portion of all such washers, said means being illustrated as spray pipes 11 and 12 respective to compartments 6 and 7. Other means for directing the liquids upon the fruit may be used. Pumping means for circulating the liquids from the compartments into the spray pipes is also provided, but such pumping means not being a part of this invention, and being well known to the art, is not illustrated in the drawing.

In most installations of fruit washing devices the mechanism that deposits the fruit upon the conveyer is lower than that upon which the conveyer discharges the washed fruit, and therefore it eliminates the usual elevators to place the conveyer upon an incline, as is shown in Fig. 1. Also this construction enables the use of a continuous conveyer, eliminating the frequent transfers due to the use of individual conveyers for each compartment, often used in such devices.

The form of conveyer best adapted to my purpose is that of alternate stationary and movable longitudinally disposed bars. The stationary bars 13 are conveniently supported upon the ends 14 of the tank 8, as shown in Fig. 1. The upper edges of these bars are toothed or notched as shown, and along this edge is disposed a yielding member, preferably of rubber. Such member 15 lies in depressions 16 formed upon the peaks of said toothed edge, as shown in detail in Fig. 3, and are secured in the lower portion of the toothed notches by a nail and yieldable washer, 17 and 18. The movable bars 19 are similar to the stationary bars 13, having similar toothed edges lined with a yieldable member similar to member 15.

At the end of the washer where the fruit is deposited upon the conveyer from a hopper 20 the movable conveyer bars are given a simultaneous circular motion. This is conveniently accomplished by the use of a pair of eccentrics 21 mounted upon a shaft 22 transversely disposed within the tank 8. Said eccentrics are connected with a cross piece 23 upon which all said movable bars are mounted, so that the circular motion imparted to said crosspiece by said eccentrics is in turn imparted to the several movable bars in unison. Said shaft 22 is driven conveniently by a pulley 24 upon the outside of the tank as shown in Fig. 2.

The operation of such a conveyer is well known in the art, and therefore is not extensively described herein. Suffice it to say that the fruit lying between any two adjacent teeth of the stationary bars is caught up by the ascending teeth of the movable bars and lifted over one of the teeth of the stationary bars into the next succeeding notch thereof, thus being propelled along by steps. A feature of such a conveyer is that it turns the fruit as it conveys it along, and thus presents every side of the fruit to the washing sprays.

It has been found desirable to give the forward or discharging end of the conveyer a greater vertical movement than that imparted to the receiving end thereof, for the purpose of accelerating the movement of the fruit at the discharge end. I accomplish this by the mechanism now to be described.

A second transverse shaft 25 is provided within the tank, and secured to said shaft are two arms 26. Said arms are connected to a cross piece 27 by links 28. Said crosspiece is connected to each of the movable bars 19, so that any motion imparted to said cross piece will also be imparted to the bars. Upon said shaft 25 outside the tank 8 there is an arm 29, which arm 29 is connected by a link 30 to a crank 31 secured upon shaft 22. The arm 29 is slotted to allow of adjustment of the link 30 thereupon. The discharge ends of the bars 19 partake of the circular motion imparted to the receiving end thereof by the eccentrics 21, but said discharging ends may also be given a greater vertical movement by suitable adjustment of the link 30 upon the arm 29. By the fruit as it leaves the conveyer is lifted higher therefrom than it is farther back thereupon, and such higher lifting allows the fruit to roll upon the receiving device more rapidly than it otherwise would.

It is obvious that with a conveyer of this type liquid may run down along the lower edge thereof, and thereby the liquid from one compartment may become mixed with the liquid from another compartment. To prevent this I provide each of the conveyer bars with a downwardly projecting peg 32 just forward of the dividing wall 10 between the compartments 6 and 7. Any liquid running down the lower edge of a conveyer bar will run down said peg and drip therefrom into its respective compartment, as shown in detail in Fig. 3. Thus, by this means I prevent intermingling of the liquids used in the washer. Other means of obtaining the same result may be employed, all embodying the spirit of my invention. One such means is illustrated in Fig. 5, wherein is shown a notch 33 in the lower edge of the conveyer bar instead of the peg 32.

My invention may be made of any size, and constructed of any materials deemed convenient and suitable in a device of this character, and while I have illustrated and described a form of construction and arrangement of parts found desirable in materializing my invention, I wish to include in this application all mechanical equivalents and substitutes that may fairly be considered to come within the scope and purview of my invention as defined in the appended claims.

Having disclosed my invention so that others may be enabled to construct and to use the same, what I claim as new, and desire to secure by Letters Patent is:

1. In a conveyer: a series of longitudinally disposed bars; notches upon the upper edges of said bars, said notches forming teeth thereupon; a groove upon the apex of each of said teeth; a yieldable member mounted within said grooves; and means for securing said member at the bottom of each of said notches.

2. In a conveyer: a series of longitudinally disposed bars; notches upon the upper edges of said bars, said notches forming teeth thereupon; and a yieldable member lining the upper edge of each of said bars, said member following the contour of said notches and said teeth.

3. An apparatus for treating fruit to remove surface accumulations comprising a two part tank, one part containing treating medium and the other rinsing medium, a conveyer mechanism mounted to move fruit through said tank by intermittent impulses, said conveyer consisting of alternately arranged fixed and movable members and positioned with the discharge end above the receiving end, a rotary means attached to one end of said movable members and an oscillatory means attached to the other end of said members causing said members at one end to travel through a circular path and at the other end through an elliptical path having the major axis in substantially a vertical position to accelerate fruit moving along said bars, the oscillatory means having adjustment to vary the movement of said members at the discharge end of said conveyer, with means for applying treating medium to fruit moved by said conveyer.

4. An apparatus for treating fruit with spray solutions, a plurality of spray means, a plurality of tank means, a plurality of conveyer elements, means for imparting a combined rotary and elliptical movement to a part of said conveyer elements to move fruit therealong whereby its speed is accelerated, said conveyer elements being spaced to permit solution to flow therebetween with slot means on the lower edges thereof to obstruct the flow of solution therealong.

FRANK W. CUTLER.